United States Patent [19]
Ludanek et al.

[11] Patent Number: 5,890,392
[45] Date of Patent: Apr. 6, 1999

[54] METHOD FOR SHIFTING A TWIN-CLUTCH TRANSMISSION AND TWIN-CLUTCH TRANSMISSION ARRANGEMENT

[75] Inventors: Harald Ludanek, Calberlah; Reinhold Haack, Brunswick; Bernd Cappelmann, Wendeburg-Neubruck, all of Germany

[73] Assignee: Volkswagen AG, Wolfsburg, Germany

[21] Appl. No.: 901,917

[22] Filed: Jul. 28, 1997

[30] Foreign Application Priority Data

Aug. 8, 1996 [DE] Germany ............ 196 31 983.8

[51] Int. Cl.⁶ ............ B60K 41/22; F16H 61/04
[52] U.S. Cl. ................ 74/331; 74/339
[58] Field of Search ............ 74/331, 336 R, 74/339

[56] References Cited

U.S. PATENT DOCUMENTS

| | | | |
|---|---|---|---|
| 4,463,621 | 8/1984 | Fisher | 74/331 |
| 4,527,678 | 7/1985 | Pierce et al. | 74/866 |
| 5,259,260 | 11/1993 | Schneider | 74/331 |
| 5,603,242 | 2/1997 | Krieger | 74/339 |
| 5,711,409 | 1/1998 | Murata | 74/336 R |

FOREIGN PATENT DOCUMENTS

| | | |
|---|---|---|
| 0042677 | 2/1981 | European Pat. Off. . |
| 0288779 | 1/1988 | European Pat. Off. . |
| 0435374 | 12/1990 | European Pat. Off. . |
| 3527401 | 7/1985 | Germany . |
| 4031851 | 8/1990 | Germany . |
| 4436526 | 10/1995 | Germany . |

OTHER PUBLICATIONS

European Patent Office Search Report, Appln. No. 97111397, dated Jul. 23, 1998.

*Primary Examiner*—Dirk Wright
*Attorney, Agent, or Firm*—Baker & Botts, L.L.P.

[57] ABSTRACT

A twin-clutch transmission has first and second transmission input shafts and a transmission output shaft, each input shaft having an associated friction clutch. In the initial state, the first clutch transmits engine torque in a state of static friction and the second clutch is open. In a shifting operation the second transmission input shaft is brought to a synchronous speed, thus permitting the engagement of a selected gear. In order to prevent a condition in which both clutches are in static friction engagement, which would result in locking up of the transmission, the speed of at least one clutch is maintained in the range of sliding friction to a value in the vicinity of the synchronization speed until the torque to be transmitted has been transferred steadily from the first clutch to the second clutch. A synchronizer is used when shifting up in the overrun condition.

25 Claims, 10 Drawing Sheets

Fig. 2
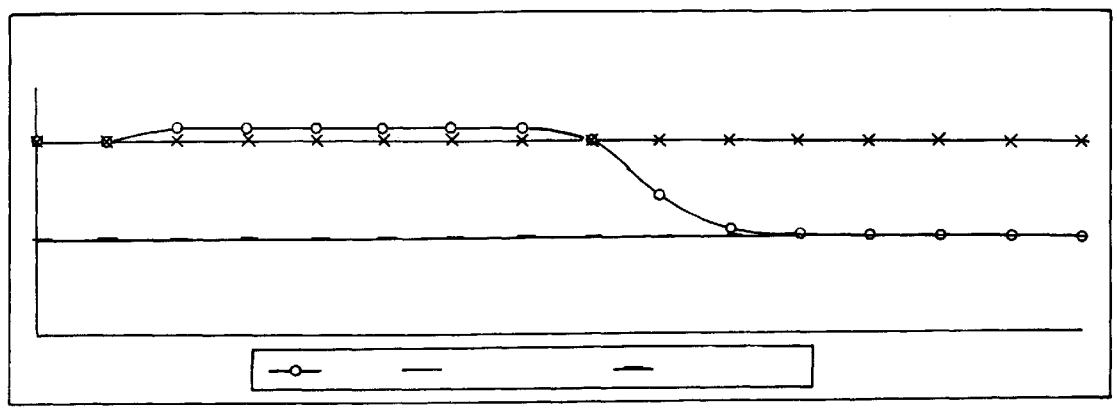
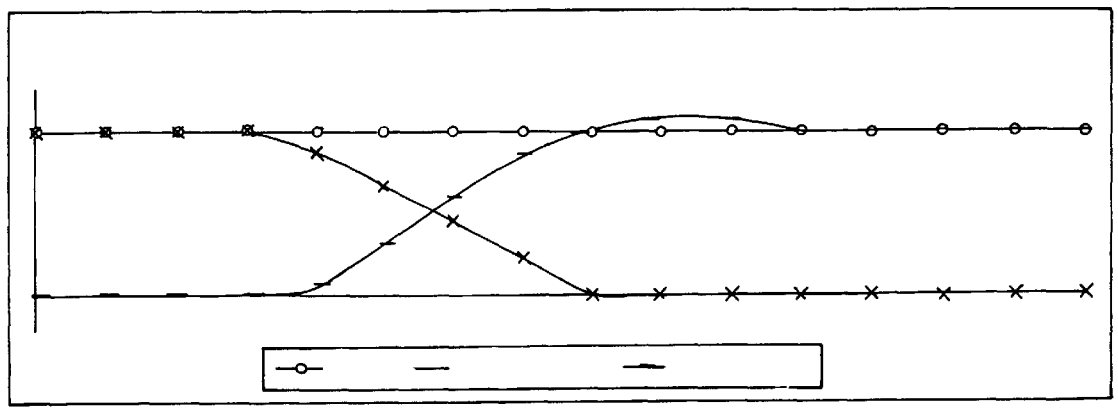
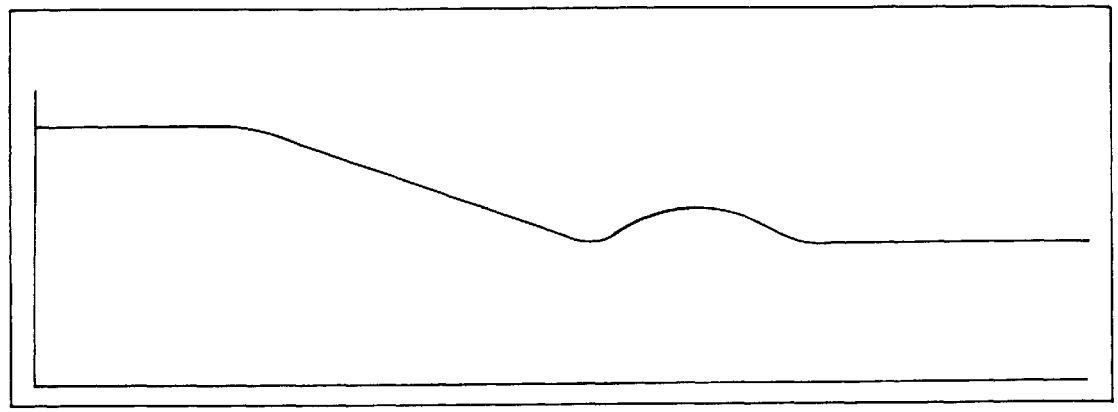

Fig. 3
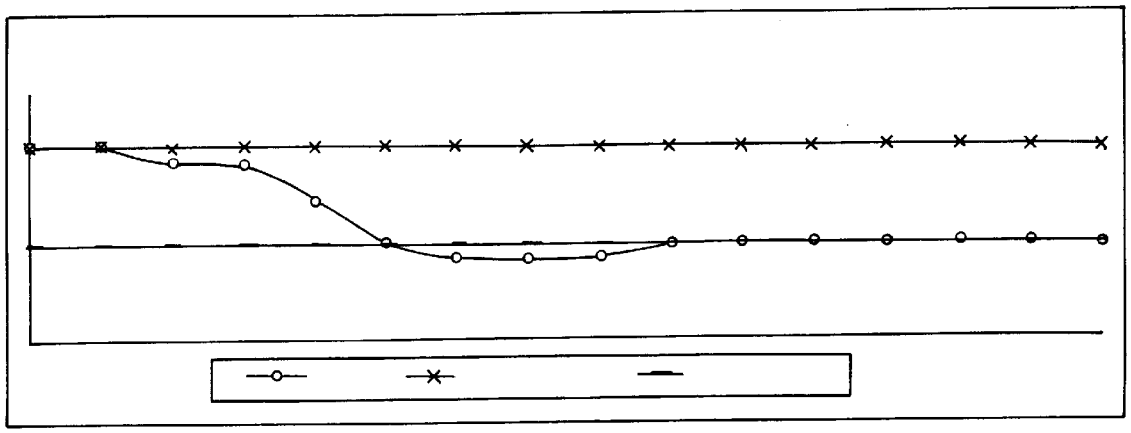
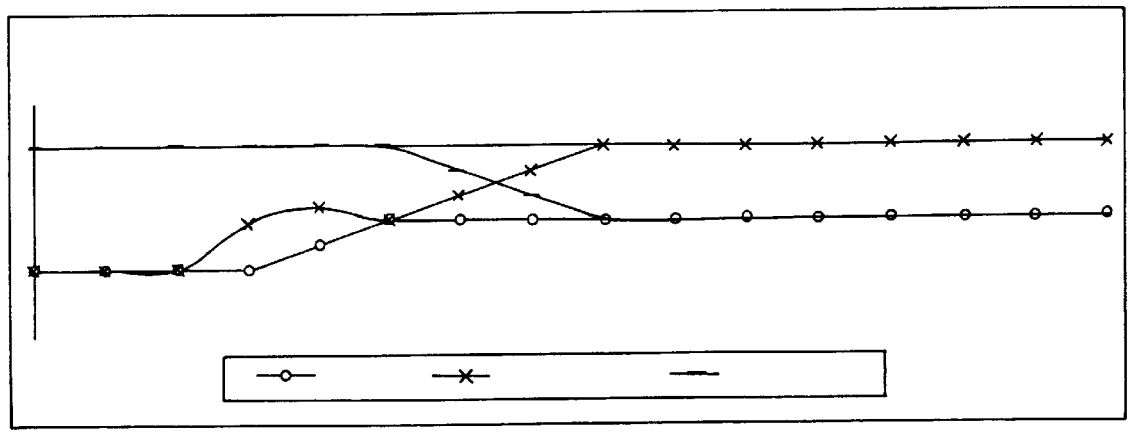
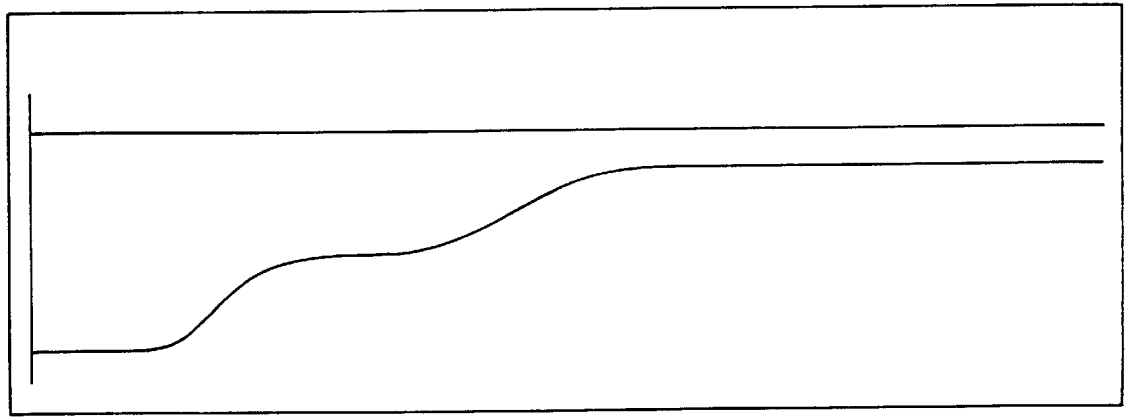

Fig. 4
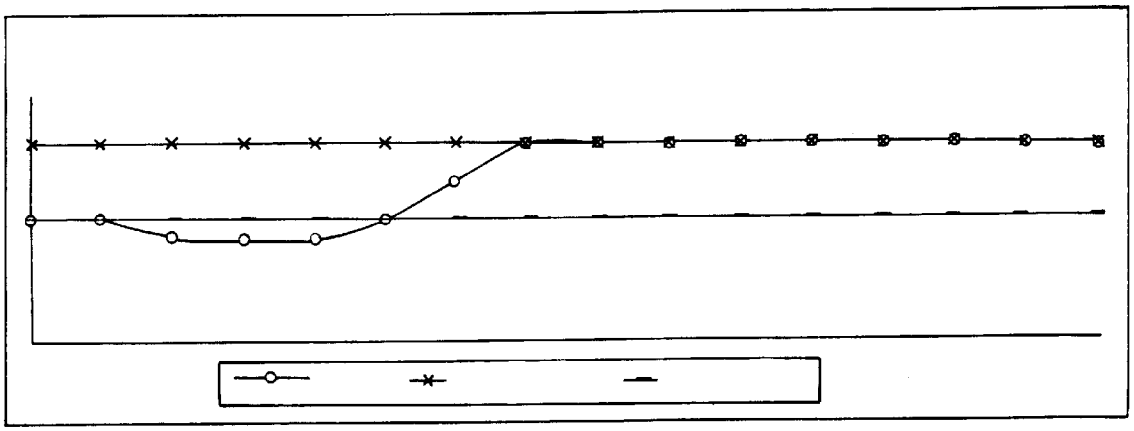
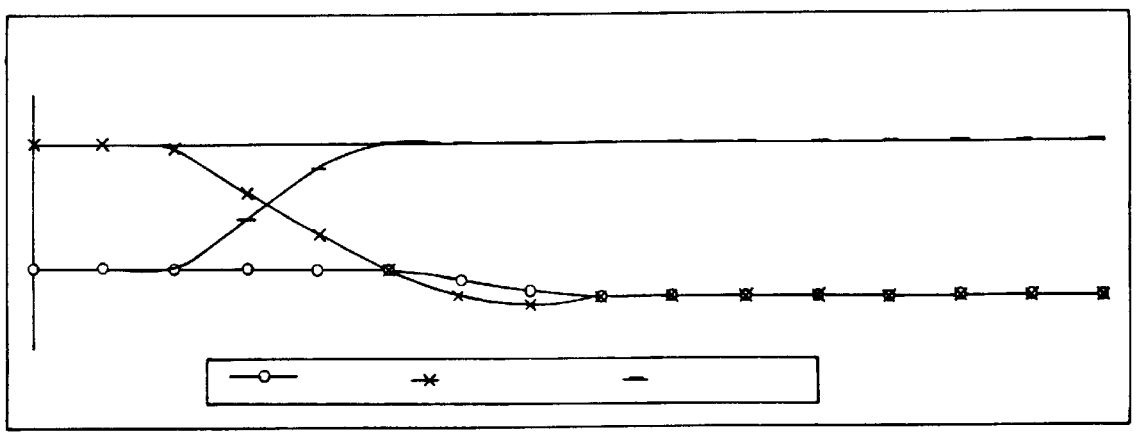
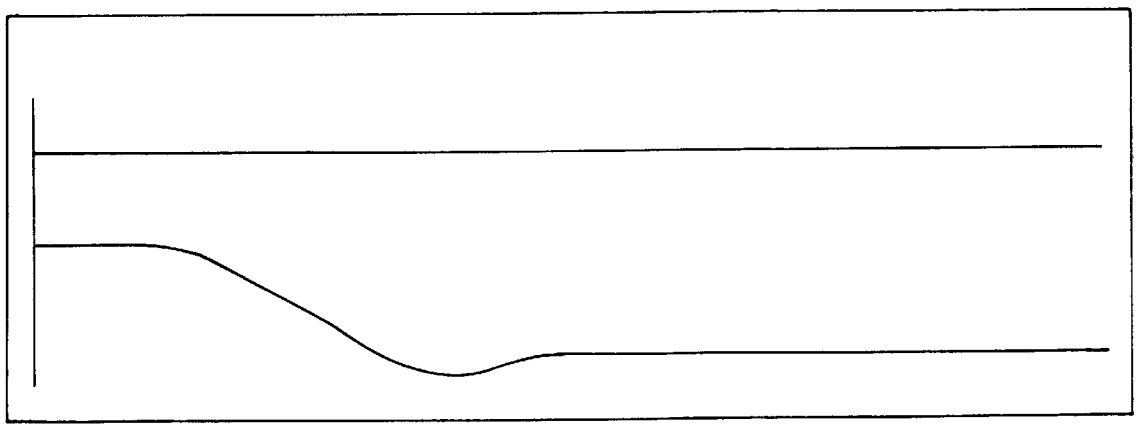

Fig. 5
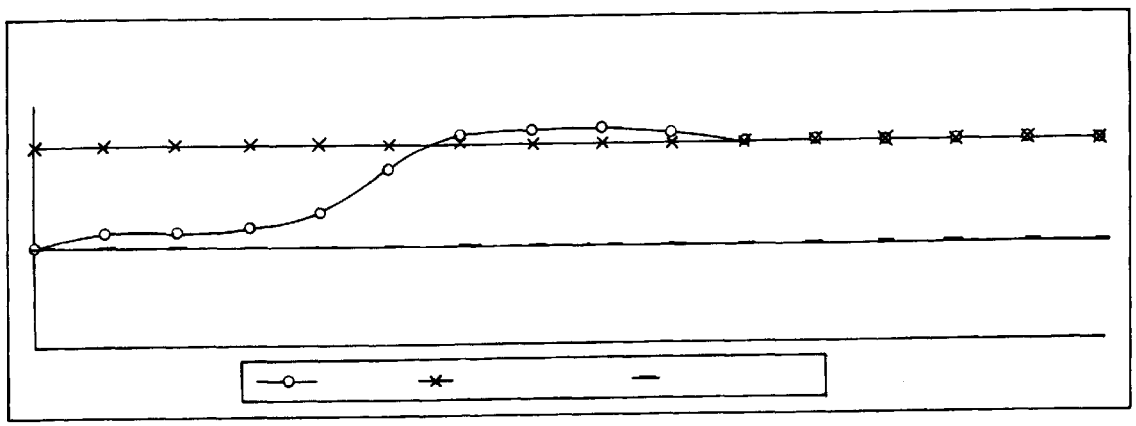
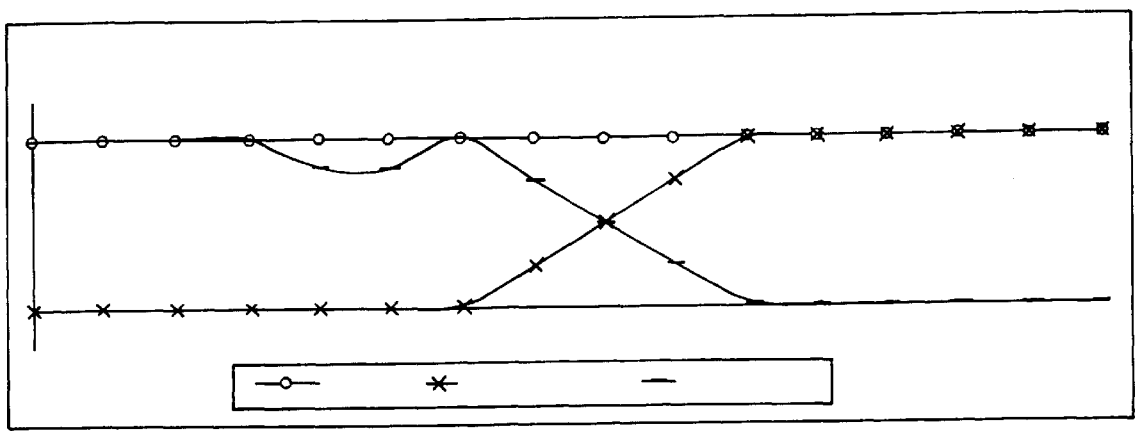
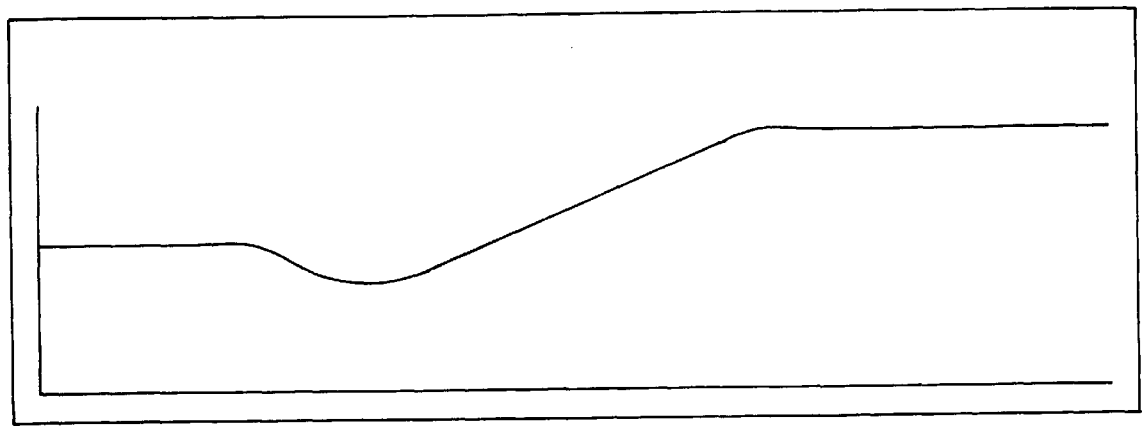

Fig.6
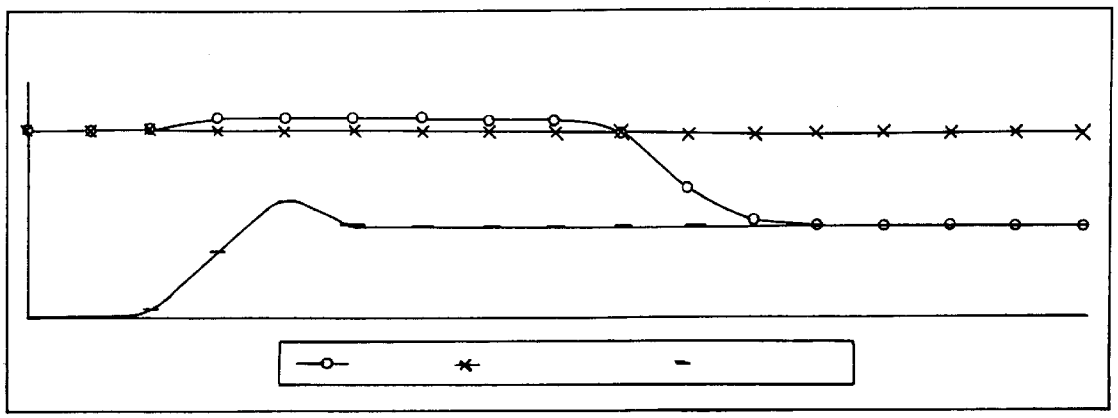
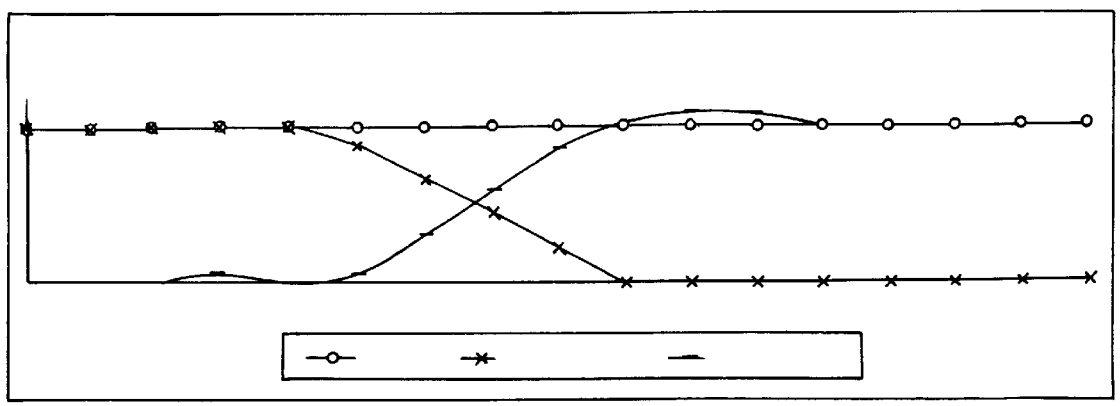
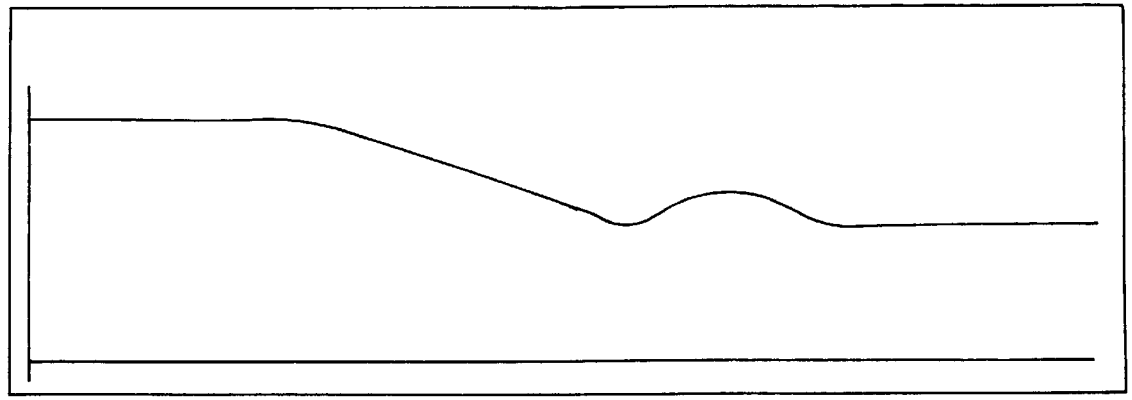

Fig. 7
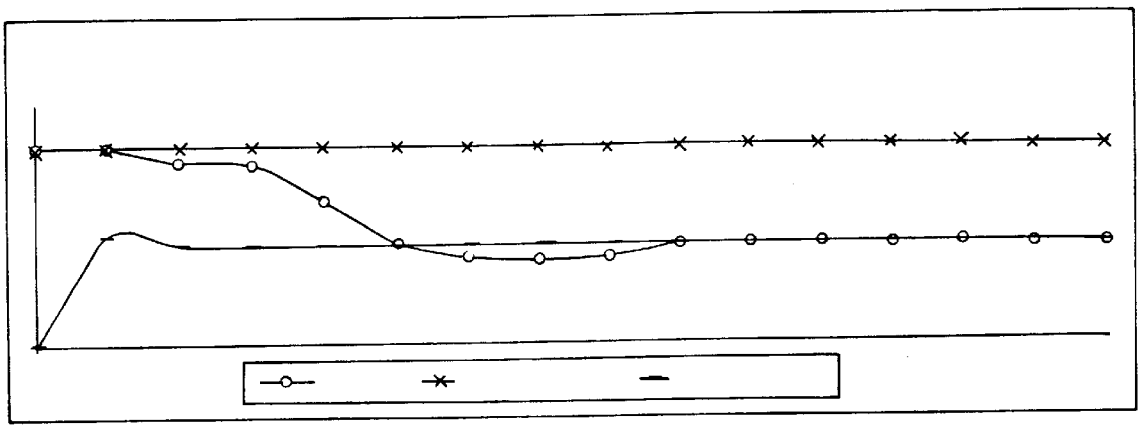
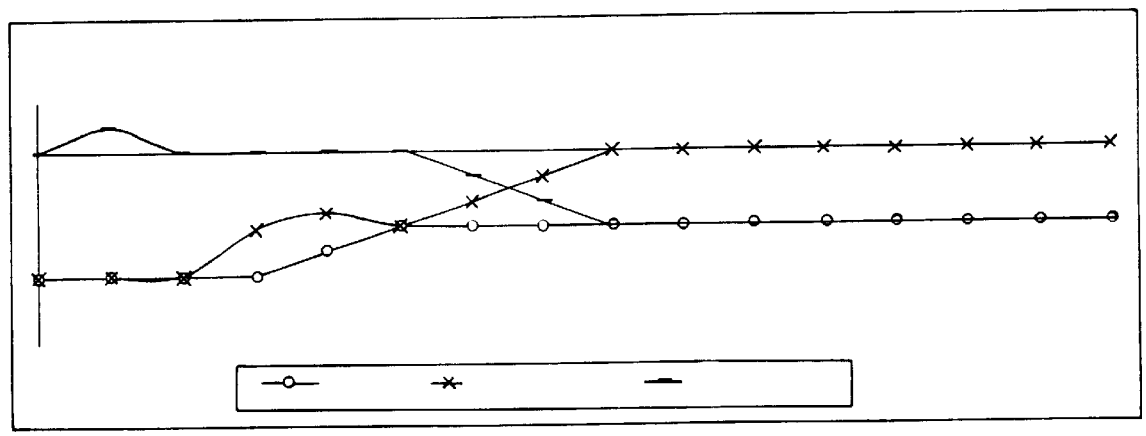
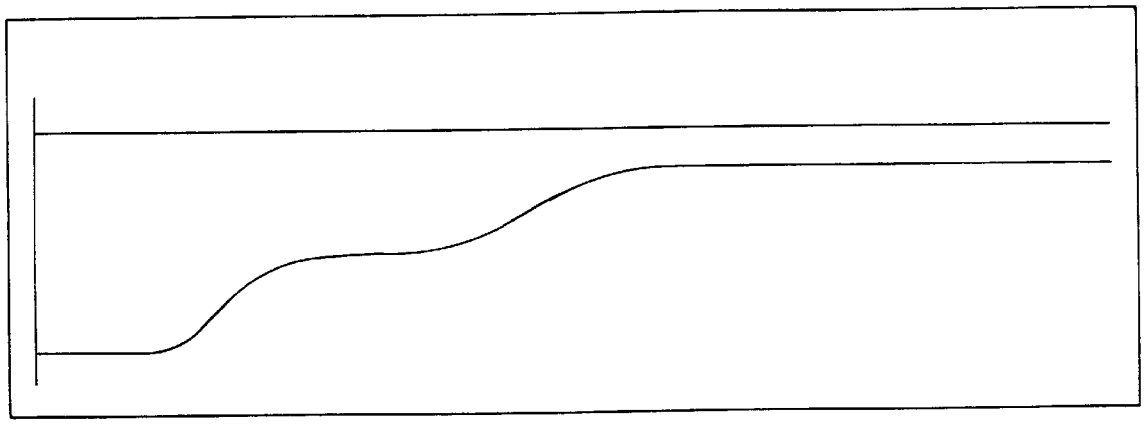

Fig. 8
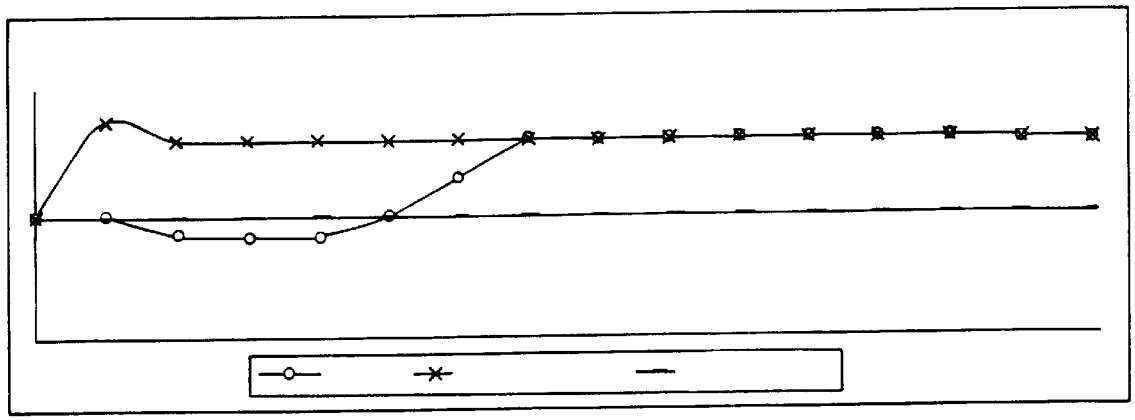
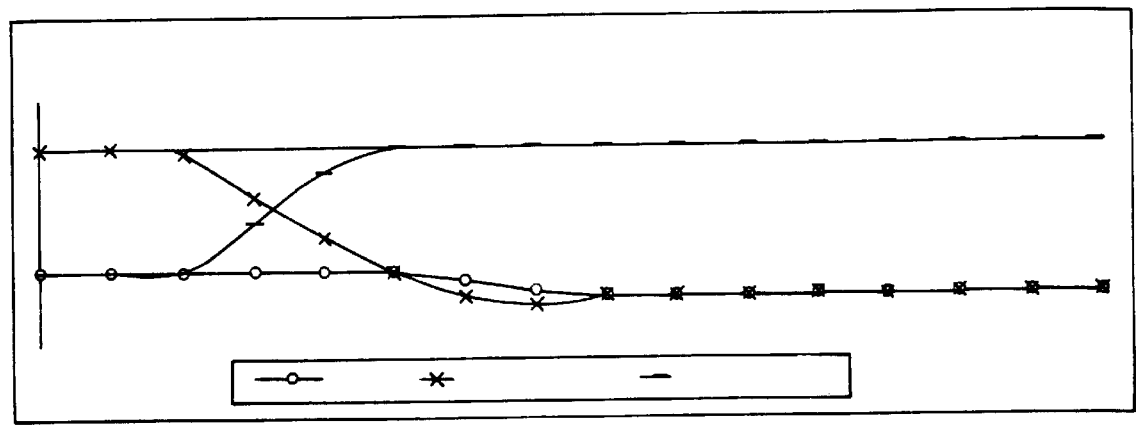
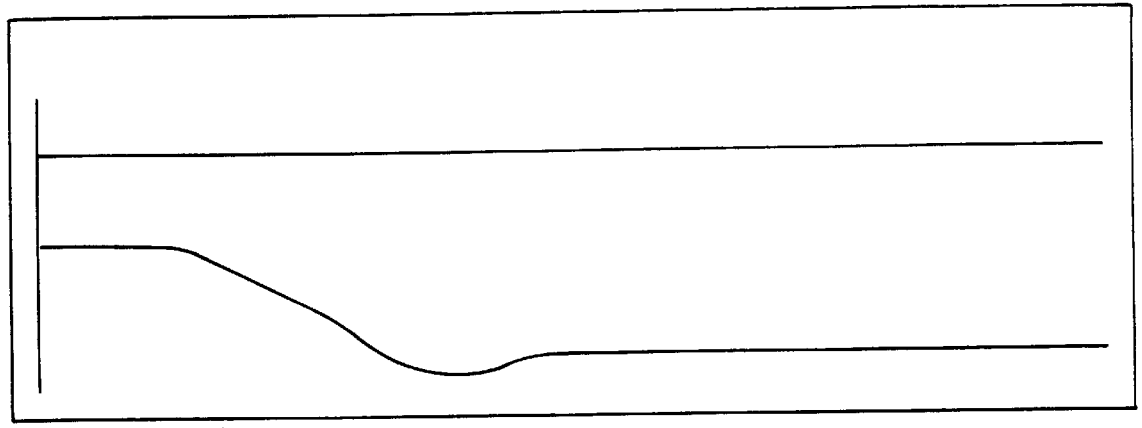

Fig. 9
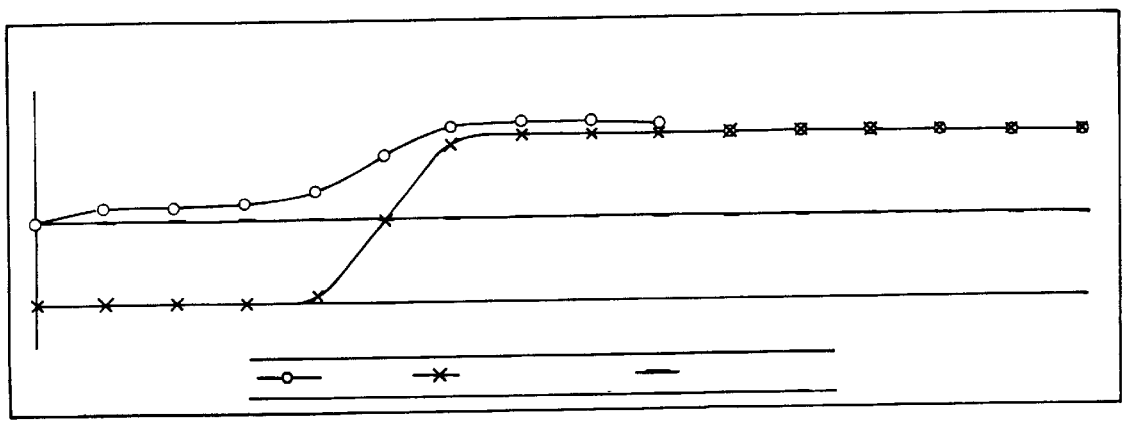
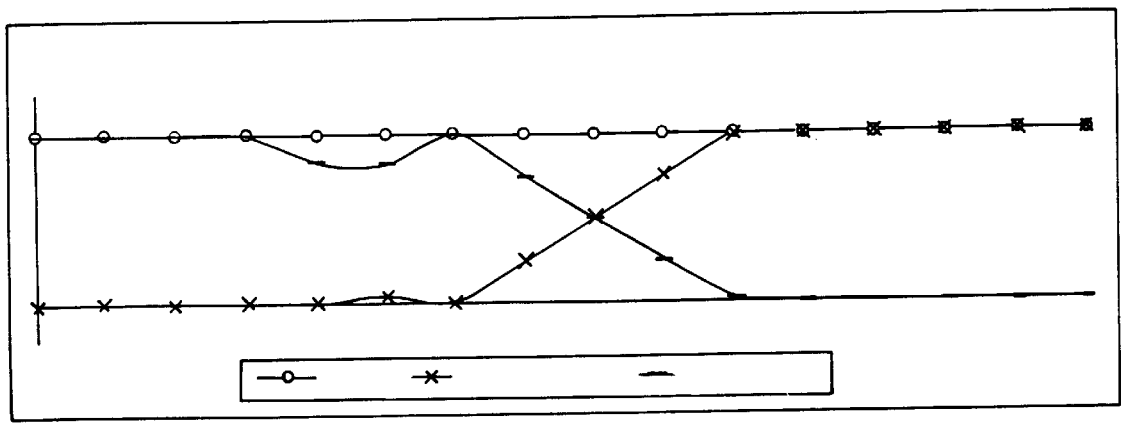
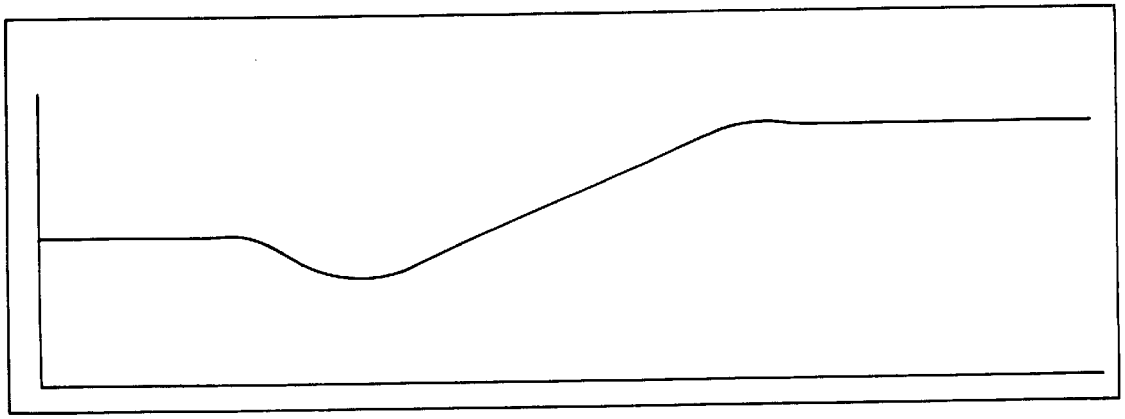

METHOD FOR SHIFTING A TWIN-CLUTCH TRANSMISSION AND TWIN-CLUTCH TRANSMISSION ARRANGEMENT

BACKGROUND OF THE INVENTION

This invention relates to methods for shifting twin-clutch transmissions having two transmission input shafts and a transmission output shaft, each input shaft having a friction clutch in which initially one of the two clutches transmits an engine torque in a state of static friction and the other clutch is open.

The invention also relates to a twin-clutch transmission having two transmission input shafts and a transmission output shaft for operation in accordance with a gear-shifting method according to the invention.

Manual transmissions used in motor vehicles are simple and robust but have the disadvantage that there is an interruption in the drive connection during gear shifting. In passenger vehicles, conventional manual transmissions are generally provided with single-cone synchronizers of the Borg-Warner type.

Although conventional automatic transmissions avoid an interruption in the drive connection during gear shifting, their efficiency is poor, among other reasons because of the need for a hydrodynamic converter for starting. Furthermore they are very heavy.

Attempts have therefore been made to shift conventional transmissions automatically and, in particular, under load.

Among the power-shift transmissions are twin-clutch transmissions of the PDK type i.e., the Porsche Twin-Clutch Transmission. This is a transmission with two transmission input shafts which act on a common transmission output shaft, and, as a rule, the two transmission input shafts are arranged coaxially with respect to each other. The gear wheels for the even-numbered transmission gears are generally located on one transmission input shaft and the gear wheels for the odd-numbered transmission gears are generally located on the other transmission input shaft. Each of the two transmission input shafts can be connected to the internal combustion engine with either sliding friction or static friction by a dedicated independent clutch.

In this way, it is possible to perform gear changes without an interruption in the drive connection. Theoretically, this makes it possible to provide automatic transmissions which have a high level of efficiency. However, this requires the use of conventional synchronizer rings.

In the design of automatically actuated twin-clutch transmissions it has been found that controlling and regulating such transmissions is complicated and that the expected vehicle occupant comfort cannot be achieved. Experience shows that gear shifting transmissions in which gear shifting is automated using the conventional locking-type synchronizer rings are associated with considerable unexpected problems. In particular, the forces and speeds of the hydraulic shifting can lead to failure of the synchronizer.

Efforts have therefore been made to operate hydraulic actuating systems with modulated pressures. The expenditure required for this purpose results in excessive costs which are unacceptable for the mass production of motor vehicles.

Other power-shift transmissions having a single start-up clutch employ an auxiliary clutch which must be provided in the highest transmission gear to enable a filler torque to be produced when changing up. This filler torque helps to minimize the interruption in the drive connection during a gear change.

Finally, there have been central synchronizers for the entire transmission for the purpose of avoiding the problems mentioned above when using the conventional locking-type synchronizer rings with hydraulic actuation. With central synchronization, a central synchronizing unit is arranged in such a way that a transmission output shaft, for example, can be braked or driven. For this purpose, additional mechanical, hydraulic or electric drives are necessary and this leads to excessive costs and weight in normal passenger vehicle construction.

Finally, engine control concepts have been developed in which control of the speed of the transmission input shaft has been carried out by appropriate control of the operation of the internal combustion engine. Because of the high masses involved and the resulting high inertias, such a method is not advantageous. Furthermore, the driver may have a subjective impression of helplessness. The increase in engine speed which naturally occurs when shifting down-on a downhill slope, for example, may frighten the inexperienced driver.

A further negative effect of conventional synchronizing operations is that torques are required for accelerating or braking the transmission input shaft, and these act on the transmission output shaft and hence on the vehicle. If the synchronizing operation is to be performed rapidly, as required for passenger vehicles, for example in less than one half-second, very strong vehicle reactions can occur since, when synchronization is achieved, the synchronizing torques collapse abruptly and the resulting large change in torque is experienced by the vehicle occupants as a powerful jerk. In order to avoid such discomfort, the modulated pressures mentioned above have been employed on automated manual transmissions having hydraulic actuating elements.

In conventional automatic transmissions, electronically synchronized transmissions, or power-shift transmissions, the disengagement of gears during shifting is frequently effected by a spring mechanism. The gears are normally held in their engaged position by an undercut in the respective dog toothing. If the torque transmitted in the transmission gear falls below a selected value, the spring force can push the shift dog out, disengaging the gear. The disadvantage with this method is that the torque at which the gear disengages is not zero, i.e. there is a torque jump, producing the above-described discomfort. It is also possible in some cases for the transmission mechanism to be distorted. Moreover, shifting up in overrun is fundamentally impossible for the power-shift transmissions mentioned above without performing an engine management operation, i.e. the negative engine torque must be increased to at least zero. This results in problems for the driver which are mentioned above since the driver may not understand various reactions of the engine and, in cases of doubt, may have a growing subjective sense of danger.

SUMMARY OF THE INVENTION

Accordingly, it is an object of the present invention to provide a method and arrangement for shifting a twin clutch transmission which overcomes the disadvantages of the prior art.

Another object of the invention is to provide a method for shifting a twin-clutch transmission and a twin-clutch transmission arrangement for operation in accordance with the method which can function without any control of the power regulating element for the internal combustion engine i.e., without engine management, and which can, at least in principle, be operated in such a way that disengagement of gears can take place with a fully open clutch and hence without any jerk.

This avoids the discomfort and the function-impairing effects of conventional mechanical synchronization systems. In addition, the installation space required for conventional synchronizer rings is eliminated and the moment of inertia is reduced. The hydraulic system of any actuating device which may be necessary for engaging the gears is then capable of being operated without pressure modulation.

These and other objects of the invention are attained by providing a twin clutch transmission shifting method in which the transmission shaft having the gear selected to be engaged is brought to a synchronous speed and the selected gear is then engaged, the clutch connecting the originally engaged gear is opened in a regulated manner by a slip controller to such an extent that, at a desired speed of the engine side of the clutch, that clutch operates at the slip limit, the clutch for the shaft containing the selected gear to be engaged is closed in a controlled manner until the clutch for the originally engaged gear, which is being operated at the slip limit by the slip controller, no longer transmits any torque, the clutch for the originally engaged gear is then fully opened so that the clutch for the newly engaged gear transmits the engine power by itself and the originally engaged gear is disengaged essentially without change of transmitted torque.

In an alternative method the transmission shaft for the gear selected to be engaged is brought to a synchronous speed and the selected gear is then engaged, the clutch for the gear selected to be engaged being closed in a regulated manner by a slip controller to such an extent that, at a defined desired speed of its engine-side half, the clutch operates at the slip limit, the clutch for the originally engaged gear is opened in a controlled manner until the clutch for the gear selected to be engaged, which is being operated at the slip limit by the slip controller, transmits the full torque resulting from the engine power and speed, the clutch for the gear selected is then fully closed so that it transmits the engine power by itself and, when the clutch for the originally engaged gear is fully open, that gear is disengaged essentially without loss of transmitted torque. Both of the foregoing methods provide the advantage of the invention to the same extent.

The transmission arrangement according to the invention include a synchronizer which can couple the freely rotating transmission input shaft, i.e. the transmission input shaft for the gear selected to be engaged, to the transmission output shaft for the purpose of synchronization. The synchronizer is preferably in the form of a friction-wheel mechanism, which has the following friction wheels: a friction wheel on the transmission input shaft to be synchronized; a friction wheel on the transmission output shaft; and a pair of friction wheels on a pivotable carrier which can be pivoted into a position in which the two other friction wheels are connected by frictional engagement.

In a particular embodiment, the transmission ratio of the friction-wheel mechanism, i.e. the ratio between the transmission output shaft and the transmission input shaft, is lower than that of the lowest gear on the transmission input shaft i.e., it provides a higher input shaft speed than in the lowest gear.

As an alternative embodiment, it is also possible to dispense with one of the two friction wheels arranged on a pivotable carrier and, instead, to arrange the other coupling friction wheel not on the output shaft but on a shaft carrying a pinion which reverses the direction of rotation for the reverse gear.

In the description and claims hereinafter, the "first" transmission input shaft refers to the input shaft which is transmitting load at the time the gear shift is initiated i.e. the shaft originally providing torque to the output shaft and the "second" transmission input shaft is the input shaft which is freely rotating at the time the gear shift is initiated and which carries the gear to be selected. In the description, this second shaft is accordingly also referred to as the "free" transmission input shaft.

The method according to the invention assumes that the second, free transmission input shaft is first brought to a synchronous speed by suitable arrangement, making it possible to engage the selected gear. Various arrangements are possible for achieving the synchronous speed of the free transmission input shaft. A synchronization arrangement utilizing the above-mentioned friction wheels is one possibility. A synchronous speed can also be achieved and engagement of the selected gear enabled by appropriate control of the clutch associated with the second transmission input shaft.

In addition to this step, the other method steps may be used to transfer the torque to be transmitted continuously from the first input shaft and its corresponding clutch to the second shaft and its clutch without a condition arising in which both clutches are in a state of static friction, i.e. are transmitting torques with different signs, which would lead to locking up of the transmission.

For this reason, provision is made, according to the invention, for the speed of at least one clutch to be controlled to a speed in the vicinity of the synchronization speed in the range of sliding friction. According to the invention, provision may be made for a desired speed to be specified for the appropriate clutch to a speed controller, this desired speed being made up of the synchronization speed plus or minus a defined slip speed. This ensures that the regulated clutch is in a state of sliding friction, thereby making it possible reliably to preclude locking up of the transmission.

A particular arrangement according to the invention proportions the desired speed of the engine side of the clutch by taking into account the operating condition of the vehicle, i.e. whether it is a traction mode or overrun mode, on the one hand, and the planned gear change, i.e. upward shift or downward shift on the other hand.

In the first embodiment of the method according to the invention, a special provision is that the desired speed should be defined as a function of the operating mode of the vehicle and of the type of gear shifting as defined in the following table:

| Operating mode of the vehicle | Type of gear shifting | Desired speed for the slip speed controller of the first clutch |
| --- | --- | --- |
| Traction mode | Shifting up | Synchronization speed of the first transmission input shaft + slip |
| Traction mode | Shifting down | Synchronization speed of the second transmission input shaft + slip |
| Overrun mode | Shifting up | Synchronization speed of the second transmission input shaft − slip |
| Overrun mode | Shifting down | Syncrhonization speed of the first transmission input shaft − slip |

Similarly, in the second embodiment of the method according to the invention, in which it is not the first clutch but the "second" clutch, assigned to the initially free shaft, which is regulated, provision can be made for the desired speed to be proportioned as defined in the following table:

| Operating mode of the vehicle | Type of gear shifting | Desired speed for the speed regulator of the second clutch |
|---|---|---|
| Traction mode | Shifting up | Synchronization speed of the first transmission input shaft + slip |
| Traction mode | Shifting down | Synchronization speed of the second transmission input shaft + slip |
| Overrun mode | Shifting up | Synchronization speed of the second transmission input shaft − slip |
| Overrun mode | Changing down | Syncrhonization speed of the first transmission input shaft − slip |

In the table, the term "slip" is to be understood to mean a predetermined speed difference, the absolute value of which can, for example, be 50 rpm. In this context, the desired speed always relates to the engine-side half of the clutch.

There are thus three distinctions to be made in the method according to the invention, providing a total of eight different cases between which a distinction has to be made. First a distinction has to be made as to whether the clutch for the original transmission gear, the "first" clutch according to the terminology of this application, should be regulated or the clutch of the selected gear, i.e. the "second" clutch according to the terminology of this application, should be regulated. A distinction has then to be made as to whether the vehicle is in overrun mode or in traction mode, i.e. whether the engine is being operated as an engine brake by providing negative torque or is driving the vehicle providing positive engine torque. Finally, a distinction has to be made as to whether, in the planned gear shifting, a shift is to be made from a lower gear to a higher gear i.e., upward shift, or from a higher gear to a lower gear, i.e. downward shift.

For each of the two method embodiments there are thus four different cases irrespective of which clutch is operated as a regulated clutch.

In carrying out the method according to the invention, the "upward shifting" mode is unproblematic both in traction mode and in overrun mode. The free transmission input shaft, i.e. the shaft carrying the selected gear, must, in the most unfavorable case, be accelerated from a standstill to a synchronization speed, which in all cases lies below the instantaneous engine speed. It is therefore possible, in all cases, by appropriate control of the associated second clutch, for the synchronization speed, which permits the engagement of the selected gear, to be achieved.

In the "downward shifting" mode, the free transmission input shaft of the selected gear is to be accelerated to speeds which are higher than the instantaneous speed of the engine driving the vehicle. According to the invention, use is made in this case either of a synchronizing aid in the form of a transmission arrangement which takes the torque required for acceleration from a transmission shaft or in the form of appropriate regulation of the two clutches to ensure that the energy stored in the flywheel and all rotating parts of the engine is converted into a high speed of the free transmission input shaft.

The last-mentioned method features cannot be employed during shifting down in the overrun mode. The braking action of the engine prevents sufficient acceleration of the free transmission input shaft, which cannot be accelerated to the necessary synchronization speed purely by clutch control or regulation.

According to the invention, it is possible, in this case, to provide an additional synchronizing aid. Another possibility is, after closure of the second clutch assigned to the free transmission input shaft to produce an increase in the speed of the engine, which is being driven by the vehicle, by engine management in order to accelerate the free transmission input shaft. The disadvantage with this method of operation is that, on the one hand, it is a prerequisite that the first clutch, assigned to the original gear, should be open in order to achieve complete separation of the transmission and engine and, on the other hand, that the sudden increase in the speed of the engine which occurs is psychologically disadvantageous. The latter is due to the fact that shifting down in the overrun mode, generally occurs when traveling downhill, when a sudden increase in the speed of the engine worries the driver.

If the method according to the invention and the apparatus according to the invention are to be carried out without engine management, which is desirable for various reasons, for example that of simplifying the whole engine control system, the synchronizing aid provided according to the invention is necessary for shifting down in the overrun mode.

Although it is the general aim of the invention to provide a twin-clutch transmission which does not have conventional synchronizer rings, it is possible, in an alternative embodiment of the invention, for the gear wheels of the lowest transmission gear on each of the two transmission input shafts to be provided with a conventional synchronizer to be used as a synchronizing aid for all the other gears on the same transmission input shaft. In this way, it is possible, for example, to construct a six-speed transmission which has conventional synchronizer rings only in first and second gears.

Although the preparation of the selected gear to be engaged when shifting up i.e. the production of the synchronization speed of the free transmission input shaft, can take place before the other method steps, and therefore the opening and closing of the two clutches serves purely to shift the engine torque gently from one shaft to the other, the method features can overlap when changing down, i.e. they can take place partially simultaneously. The latter is the case especially when the free transmission input shaft of the low gear is to be accelerated by closing the second clutch.

While the free transmission input shaft must, in general, be first accelerated to the synchronization speed, cases are conceivable in which it is accelerated beyond the synchronization speed, to a higher speed, and the selected gear to be engaged is engaged during subsequent deceleration of the transmission input shaft. This process can be expedited by providing an additional friction arrangement or the like in order to brake the transmission input shaft to slow it to the synchronization speed.

BRIEF DESCRIPTION OF THE DRAWINGS

Further objects and advantages of the invention will be apparent from a reading of the following description in conjunction with the accompanying drawings in which:

FIG. 2 is a series of graphical representations showing the variations in the engine and transmission input speeds, the engine and transmission input torques and the transmission output torque during shifting up under traction;

FIG. 3 is a series of graphical representations showing the variations in the engine and transmission input speeds, the engine and transmission input torques and the transmission output torque during shifting up in overrun;

FIG. 4 is a series of graphical representations showing the variations in the engine and transmission input speeds, the engine and transmission input torques and the transmission output torque during shifting down in overrun;

FIG. 5 is a series of graphical representations showing the variations in the engine and transmission input speeds, the engine and transmission input torques and the transmission output torque during shifting down under traction;

FIG. 6 is a series of graphical representations similar to FIG. 2, but also taking into account gear engagement;

FIG. 7 is a series of graphical representations similar to FIG. 3, but also taking into account gear engagement;

FIG. 8 is a series of graphical representations similar to FIG. 4, but also taking into account gear engagement;

FIG. 9 is a series of graphical representations similar to FIG. 5, but also taking into account gear engagement; and FIG. 10 is a schematic diagram illustrating an alternative embodiment of a synchronizer according to the invention, in which the reverse gear pinion, which affects the direction of gear rotation, has additionally been coupled in.

DESCRIPTION OF PREFERRED EMBODIMENTS

Figure 1:
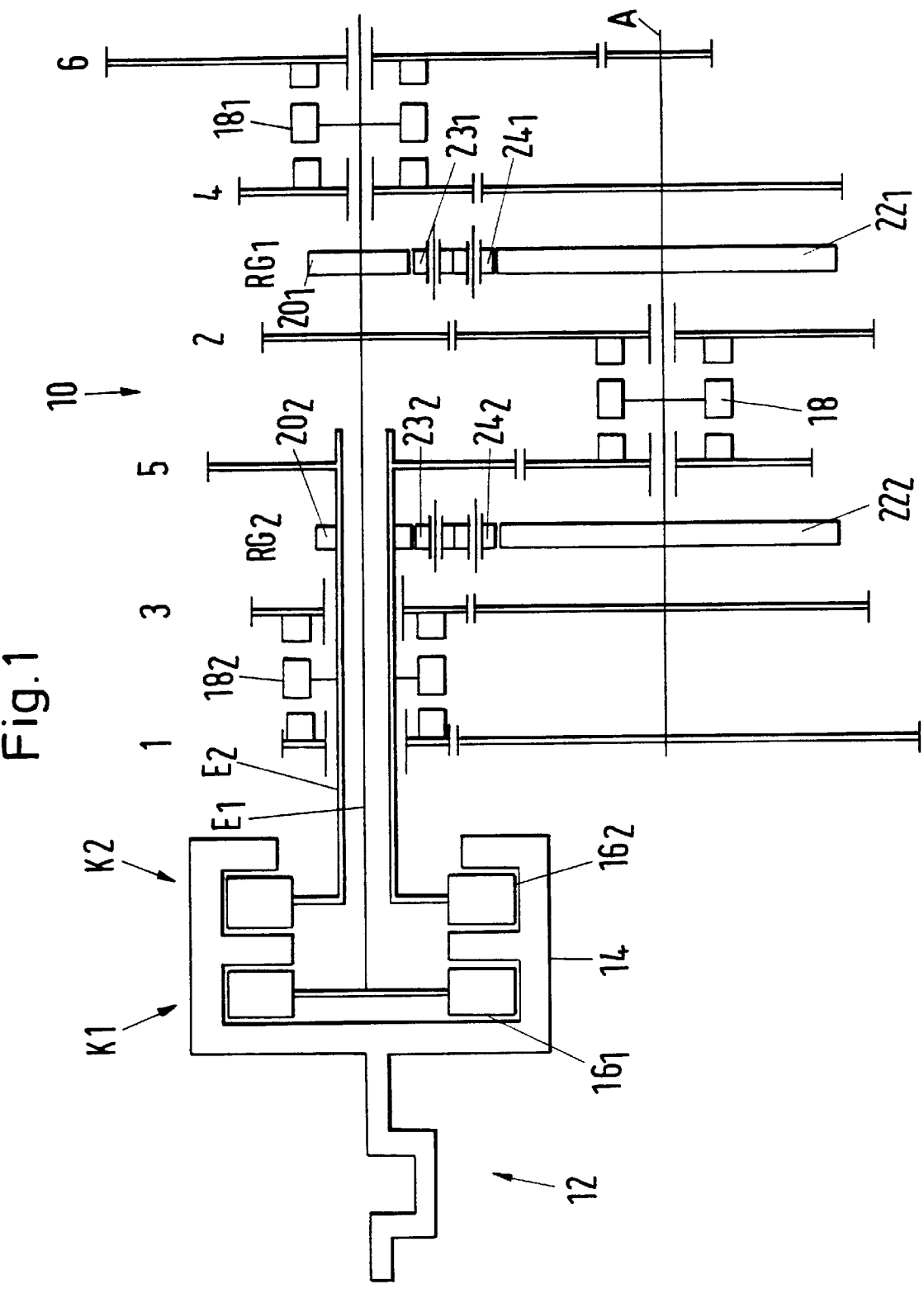
FIG. 1 is a schematic diagram showing the arrangement of a representative embodiment of a twin-clutch transmission according to the invention having a synchronizer.

In the typical embodiment of the invention shown schematically in FIG. 1, a twin-clutch transmission 10 is driven by an internal combustion engine symbolized by its crankshaft 12. Two clutches $K_1$ and $K_2$ have a common outer clutch cage 14 driven by the engine and are arranged concentrically adjacent to one another. Connected to the friction plates $16_1$ and $16_2$ of the clutches $K_1$ and $K_2$ respectively, are two transmission input shafts $E_1$ and $E_2$. The transmission input shaft $E_2$ is a hollow shaft which surrounds the transmission input shaft $E_1$.

The individual transmission gears are represented by a total of six gear wheel pairs 1–6. The input wheels of transmission gears 5 and 2 are rigidly connected to the transmission input shafts $E_1$ and $E_2$ respectively, while the input wheels of the transmission gears 1, 3, 4 and 6 are floating wheels, which are supported by needle bearings and can be actuated by dogs utilizing sliding sleeves $18_1$ and $18_2$, respectively.

A transmission output shaft A carries a total of six output wheels, the output wheels of the transmission gears 5 and 2 being floating wheels and being capable of being shifted using a sliding sleeve 18. The output wheels of the gears 1, 3, 4 and 6 are rigidly connected to the transmission output shaft A.

In first transmission gear, power is transmitted through the closed clutch $K_2$, the transmission input shaft $E_2$, the sliding sleeve $18_A$ and the input wheel of the first gear to the output wheel of the first transmission gear and the transmission output shaft A.

With the clutch $K_2$ engaged and the sliding sleeve $18_2$ displaced to the right the third transmission gear is engaged, while, with the clutch $K_2$ engaged and the sliding sleeve $18_A$ in the left-hand position, the fifth transmission gear is engaged.

Similarly, with the clutch $K_1$ engaged but the clutch $K_2$ opened, the gears 2, 4 and 6 may be engaged, depending on the position of the sliding sleeves $18_1$, $18_2$ and $18_A$.

As mentioned previously, the clutch which transmits the engine power in the initial state prior to a shifting operation, i.e. the clutch which is essentially in the engaged state, i.e. which is a state of static friction, is the first clutch, while the clutch which is associated with the selected gear to be engaged after shifting is in each case the second clutch. The possible gear-change operations are explained below with reference to FIGS. 2–9.

For all the illustrations, the following fundamental considerations apply: with twin-clutch transmissions, it is possible, with the gears engaged, for both clutches to be in engagement. Nevertheless, it is only possible for one clutch to be in a condition of static friction. Permissible operating conditions are those in which either one clutch is in a state of static friction and the other clutch is in a state of sliding friction or both clutches are in a state of sliding friction. For each individual clutch, the following applies:

a) If one clutch is in a state of sliding friction and the engine speed is greater than the transmission input shaft speed, a positive torque i.e., a torque which drives the vehicle, is applied to the transmission input shaft.

b) If one clutch is in a state of sliding friction and the engine speed is less than the transmission input shaft speed, a negative torque i.e., a torque which brakes the vehicles is applied to the transmission input shaft.

Where both clutches of a twin-clutch transmission are in a state of sliding friction, the following applies:

a) If the engine speed is greater than the transmission input speed of the lower gear, both transmission input shafts transmit positive torque.

b) If the engine speed is less than the transmission input speed of the higher gear, both transmission input shafts transmit negative torque.

c) If the lower gear is in a state of static friction, the higher gear transmits positive torque.

The lower gear is always the one with the higher transmission input speed.

In FIGS. 2–5, it has been assumed that the selected gear, i.e. the gear to which a shift is to be made, has already been engaged.

The procedure for engaging the gears will be additionally described with reference to FIGS. 6–9.

In these illustrations, the following simplifications have been made:

a) No vehicle acceleration during the gear-shifting operation has been indicated.

b) No change in the torque of the engine due to a change in speed upon introduction of permanent slip has been indicated.

c) No change in torque due to a change in the speed of the engine during the gear-shifting operations under traction has been indicated.

FIG. 2 shows shifting up under traction, i.e. the engine is supplying a positive torque to the transmission. Initially, the clutch of the lower gear is in a state of static friction, and the higher gear is assumed to be already engaged but the associated clutch to be still open.

A slip regulation operation is now carried out for the clutch of the lower gear, that clutch being in a state of static friction and transmitting the engine power. For this purpose, the clutch contact pressure and/or the clutch displacement are reduced to such an extent that the clutch slips with a very slight slip. The degree of slip is then maintained by controller functions based on a desired speed stipulation, it being possible for the control unit to draw the conclusion in advance that the engine is in traction mode from the fact that in the slipping mode the engine speed is higher than the transmission input speeds. The clutch of the higher gear is now closed in accordance with a ramp, initially without regulation. In this process, the high gear takes over an increasing proportion of engine torque. At the same time, the clutch of the lower gear is opened by the slip controller to the same degree once the higher gear receives the full engine torque, the clutch of the lower gear is completely open.

The lower gear can then be taken out of the drive line without any torque reaction, i.e. without discomfort to the vehicle occupants.

However, since the engine is still running at the speed level of the lower gear, its speed must be reduced to the level of the higher gear to allow the second clutch to be engaged with static friction. For this purpose, the energy stored in the flywheel must be reduced. This is achieved by temporarily increasing the torque of the clutch of the higher gear in a regulated manner. In order to avoid torque jumps, a corresponding speed characteristic must be chosen. Methods for this are known from the prior art.

As an alternative, the control strategy can be reversed by bringing the selected gear to a synchronomous speed and engaging that gear, then closing the second clutch in a regulated manner by a slip controller so that it operates at a slip limit, then opening the first clutch in a regulated manner with the second clutch transmitting all of the engine torque and fully closing the second clutch and disengaging the first clutch.

While FIG. 2 illustrates the method according to the invention for clutch actuation, FIG. 6 additionally shows, similarly to FIG. 2, how the gear selected for the gear shift can be engaged without using synchronizer rings when shifting up under traction.

In the initial state, the engine first rotates at the higher speed of the lower gear. It is assumed that the higher gear has not yet been engaged. Since the second clutch has been opened, the associated transmission input shaft is ideally not rotating, but, in practice, it does rotate slightly because of unavoidable drag torques. The second clutch of the higher gear is now partially closed. The speed of the freely rotating transmission input shaft of the selected gear is increased by the clutch torque. When the synchronization speed is reached, the higher gear is engaged. If the synchronization speed of the higher gear is then exceeded, the first clutch is opened completely. The selected gear has now been engaged.

As an alternative, provision can be made for the synchronization speed of the higher gear to be initially exceeded and for the first clutch then to be opened. As the transmission input shaft subsequently slows down, that shaft will re-attain the synchronization speed from the higher speed. If the slowing down does not occur quickly enough, a friction brake can be used, and this can be employed as an additional synchronization aid.

FIGS. 3 and 7 show in a similar manner the conditions for shifting up in overrun. As FIG. 3 shows, the first clutch of the lower gear is initially closed, while the higher gear is engaged but the associated second clutch is still open. The engine is supplying a negative torque, i.e. it is operating as an engine brake. As already explained in connection with the previous gear shifting operations, the first clutch of the lower gear is made to slip, i.e. the clutch contact pressure and/or the clutch displacement are reduced until the first clutch is slipping with a small amount of slip, for example at the synchronization speed minus 50 rpm.

The first clutch of the lower gear now in a state of sliding friction is still transmitting the entire engine torque. From the fact that the engine speed in the slipping mode is lower than the input shaft speed of the lower gear, the system can determine that the engine is in the overrun mode.

In the overrun mode, the first clutch, i.e. the clutch of the lower gear, is initially opened in a controlled manner. In this case, the engine speed falls since the braking effect disappears. The slip controller of the first clutch is then operated so that the engine speed adjusts to a speed which is just below that of the higher gear i.e., the desired speed, while remaining close to that speed.

For the first clutch of the lower gear, the slip controller now holds the speed just below the speed of the high gear. The second clutch of the higher gear then closes in accordance with a ramp, whereby the slip controller of the lower gear is opened to an ever increasing extent. When the first clutch of the lower gear is completely open, that gear can be disengaged. The second clutch of the higher gear continues to close in accordance with a ramp until a state of static friction is reached.

The gear engagement operation in accordance with FIG. 7 takes place in a manner similar to that shown in FIG. 6.

FIGS. 4 and 8 show the conditions for shifting down in overrun.

In this case, and only in this case, the use of an additional synchronizer, which is illustrated schematically in FIG. 1, is required. In order to be able to accelerate the transmission input shaft $E_1$ or $E_2$ when shifting down to the necessary speeds without increasing the engine speed by an engine management system, the friction-wheel arrangement $RG_1$ and $RG_2$ are provided, each of which can connect one transmission input shaft $E_1$ or $E_2$ to the transmission output shaft A.

Each friction-wheel arrangement $RG_1$ and $RG_2$ has a friction wheel $20_1$ or $20_2$ on the corresponding transmission input shaft $E_1$ or $E_2$.

Similarly, two friction wheels $22_1$ and $22_2$ are on the output shaft. Between the friction wheels $20_1$ and $22_1$ and $20_2$ and $22_2$ are pairs of friction wheels $23_1$ and $24_1$ and $23_2$ and $24_2$ respectively, each on a pivotable carrier.

If one of the pivotable friction-wheel pairs is pivoted out of frictional engagement with the friction wheels on the transmission input and output shafts, the transmission input shaft and the output shaft rotate freely with respect to each other.

If it is assumed, for example, that, in the exemplary embodiment shown in FIG. 4, the fourth gear has been selected and represents the initial state, the transmission input shaft $E_2$ must be accelerated when shifting down to the third gear since a higher speed level is necessary in third gear than in fourth gear. This can be effected by engaging the friction wheel arrangement $RG_2$. The friction wheel pair $23_2$ and $24_2$ is pivoted into frictional engagement, so that the torque applied to the output shaft, which is supplied by the entire rotational moment of inertia of the motor vehicle ($J_{RED,KFZ}$), applied to the output shaft, can be used to accelerate the transmission input shaft $E_2$ until a speed just above the synchronization speed of the selected gear has been reached. The friction pair $23_2$ and $24_2$ is then taken out of the friction position and the slowing-down transmission input shaft E2 can be shifted as it passes through the synchronization speed.

Similarly, the friction-wheel mechanism $RG_1$ is used in the overrun mode, i.e. with a negative engine torque providing engine braking, when the intention is to change down from an uneven-numbered transmission gear to an even-numbered transmission gear, for which purpose the transmission input shaft $E_1$ must be accelerated. One example of this is shifting down from third gear to second gear when traveling downhill.

The gear-shifting operations when shifting down in overrun are otherwise equivalent to those for shifting up under traction.

In each, an inverted control strategy for the clutches $K_1$ and $K_2$ is also possible.

FIGS. 5 and 9 show the last possibility for shifting down under traction.

As FIG. 5 shows, the first clutch of the higher gear is closed, i.e. in a state of static friction, while the lower gear is not engaged, and the associated second clutch is open. The engine is supplying a positive torque, i.e. is driving the vehicle. The slip-controller is now activated to engage the higher gear.

The first clutch of the higher gear then transmits the entire engine torque in a state of sliding friction. From the fact that the engine speed in the slipping mode is higher than the transmission shaft speed, the system can determine that the engine is in the traction mode. The first clutch is initially opened in a controlled manner by means of a ramp.

In this process, the engine speed increases. The slip controller of the first clutch is then operated so that the engine speed adjusts to a speed just above that of the lower gear while remaining close to that speed.

Since the first clutch of the higher gear was opened in accordance with a ramp or in a regulated manner, the engine speed increased, allowing the second clutch of the lower gear to adjust the associated transmission input shaft to the engine speed. When the synchronization speed is reached, the lower gear is engaged in accordance with FIG. 9.

The slip controller holds the speed of the first clutch of the higher gear just above the synchronization speed of the lower gear, i.e. the desired speed. The clutch of the lower gear now closes in accordance with a ramp, whereby the slip controller opens the first clutch of the higher gear to an ever increasing extent. When the first clutch of the higher gear is completely open, that gear can be disengaged. The second clutch of the lower gear continues to close in accordance with a ramp until a state of static friction is reached.

In addition to the four basic categories of gear shifting mentioned above, hybrid forms can also occur. Thus, for example, it is necessary to use the synchronizer described in the special case of shifting down from traction to overrun.

Figure 10:
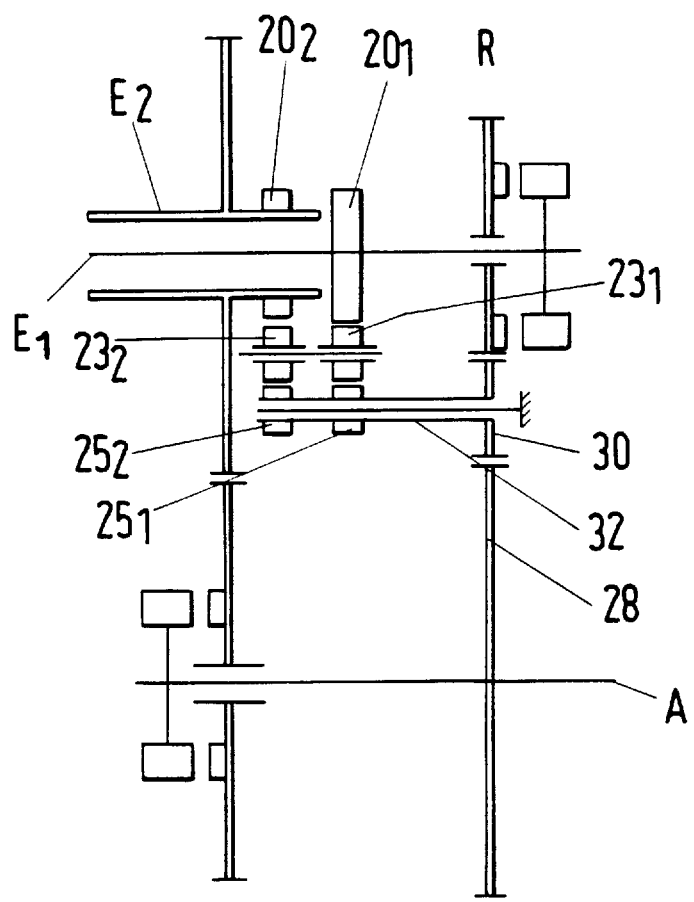

FIG. 10 shows, as an exemplary embodiment, an arrangement for the synchronizer of the invention using the reverse gear. The torque supplied by the output shaft A, which corresponds to the rotational moment of inertia of the entire vehicle and is used to accelerate either transmission input shaft $E_2$ or transmission input shaft $E_1$, is transmitted through a gearwheel 28 of the reverse gear R to a pinion 30 used to reverse the direction of rotation. A shaft 32 connected to the pinion carries two friction wheels $25_1$ and $25_2$. Since a reversal of the direction of rotation has already taken place, only one friction wheel $23_1$ or $23_2$ is necessary to accelerate the selected transmission shaft using the corresponding friction wheel $20_1$ or $20_2$. The pivotable friction wheels $23_1$ and $23_2$ are arranged on a common shaft. The driving friction wheels $25_1$ and $25_2$ can, like the friction wheels $23_1$ and $23_2$ used for coupling, each be combined into a roller, i.e. a cylindrical friction wheel.

The embodiment described above with respect to FIG. 10 requires less installation space.

Although the invention has been described herein with reference to specific embodiments, many modifications and variations therein will readily occur to those skilled in the art. Accordingly, all such variations and modifications are included within the intended scope of the invention.

We claim:

1. A method for shifting a twin-clutch transmission having first and second transmission input shafts and a transmission output shaft, the input shafts having associated first and second clutches, respectively, in which the first clutch initially transmits engine torque in a state of static friction and the second clutch is initially open, comprising;

bringing the second transmission shaft to a synchronous speed with a selected gear to be engaged and engaging the selected gear;

opening the first clutch in a regulated manner using a slip controller so that, at a desired speed of the engine side of the first clutch, the clutch operates at a slip limit, closing the second clutch in a controlled manner until the first clutch, which is being operated at the slip limit by the slip controller, no longer transmits any torque, fully opening the first clutch so that the second clutch transmits the engine power by itself; and disengaging the initial gear essentially without loss of torque;

wherein the speed of the second transmission input shaft is changed with the aid of a synchronizer to the appropriate synchronous speed; and wherein the synchronizer takes torque required to accelerate the second transmission input shaft from the transmission output shaft.

2. A method for shifting a twin-clutch transmission having first and second transmission input shafts and a transmission output shaft, the input shafts having associates first and second friction clutches, respectively, in which the first clutch initially transmits engine torque in a state of static friction and the second clutch is initially open comprising:

bringing the second transmission shaft to a synchronous speed with a selected gear to be engaged and engaging the selected gear;

closing the second clutch in a regulated manner using a slip controller so that, at a desired speed of the engine-side of the second clutch, the second clutch operates at a slip limit, opening the first clutch in a controlled manner until the second clutch, which is being operated at the slip limit by the slip controller, transmits the full torque from the engine;

fully closing the second clutch, so that the second clutch transmits the engine power by itself; and when the first clutch is fully open, disengaging the initial gear essentially without torque;

wherein the speed of the second transmission input shaft is changed with the aid of a synchronizer to the appropriate synchronous speed; and wherein the synchronizer takes torque required to accelerate the second transmission input shaft from the transmission output shaft.

3. A method according to either of claims 1 and 2 wherein the synchronizer connects the transmission output shaft to the second transmission input shaft to be accelerated with a transmission ratio which is lower than that of the lowest transmission gear on the second transmission input shaft.

4. A method according to either of claims 1 and 2 wherein the speed of the second transmission input shaft is changed to a synchronous speed by actuating the associated second clutch.

5. A method according to either of claims 1 and 2 wherein the initially engaged transmission gear is disengaged when it is not transmitting any torque.

6. A method according to either of claims 1 and 2 including the step of braking the second transmission input shaft using a friction brake.

7. A method according to either of claims 1 and 2 and including activating a hydraulic actuating device without pressure modulation to shift the gears.

8. A method according to either of claims 1 and 2 wherein shifting is effected without using a power regulating element for an internal combustion engine supplying power to the transmission.

9. A method according to claim 1 further comprising:

detecting a traction or overrun condition of the vehicle from the sign of the slip of the first clutch;

defining the desired speed in the case of traction operation and shifting up as the synchronization speed of the first transmission input shaft plus a defined slip speed;

defining the desired speed in the case of traction operation and shifting down as the synchronization speed of the second transmission input shaft plus a defined slip speed;

defining the desired speed in the case of overrun operation and shifting up as the synchronization speed of the second transmission input shaft minus a defined slip speed; and defining the desired speed in the case of overrun operation and shifting down as the synchronization speed of the first transmission input shaft minus a defined slip speed.

10. A method according to claim 2 further comprising:

detecting a traction or overrun operation of the vehicle from the sign of the slip of the first clutch;

defining the desired speed of the second clutch in the case of traction operation and shifting up as the synchronization speed of the first transmission input shaft plus a defined slip speed;

defining the desired speed of the second clutch in the case of traction operation and shifting down as the synchronization speed of the second transmission input shaft plus a defined slip speed;

defining the desired speed of the second clutch in the case of overrun operation and shifting up as the synchronization speed of the second transmission input shaft minus a defined slip speed; and defining the desired speed of the second clutch in the case of overrun operation and shifting down as the synchronization speed of the first transmission input shaft minus a defined slip speed.

11. A method according to either of claims 9 and 10 wherein the actuation of the regulated clutch by the slip controller starts later than the actuation of the unregulated clutch.

12. A method according to either of claims 9 and 10 further comprising closing the second clutch of the higher gear to such an extent that the speed of the freely rotating transmission input shaft of the higher gear to be engaged is raised to at least the synchronization speed to prepare an upward shift and engaging the higher gear when the synchronization speed is reached.

13. A method according to claim 12 wherein the synchronization speed of the higher gear is initially exceeded and, after the synchronization speed of the higher gear has been exceeded, the second clutch is completely opened and, as the transmission input shaft slows down, the higher gear is engaged at the synchronization speed.

14. A method according to claim 13 wherein the second, freely rotating transmission input shaft is braked by friction means once the synchronization speed of the higher gear has been exceeded.

15. A method according to claim 4 wherein the speed of the second free transmission input shaft is accelerated to a synchronous speed following actuation of the associated second clutch when shifting down in the overrun mode by increasing the speed of the engine and engaging the selected lower gear when the synchronization speed is reached.

16. A method according to either of claims 9 and 10 wherein the selected lower gear is engaged after closure of the second clutch when shifting down in the traction mode when the speed of the second transmission input shaft reaches the synchronization speed upon opening of the first clutch.

17. A method according to either of claims 1 and 2 wherein, to prepare for a downward shift in overrun mode, the speed of the freely rotating transmission input shaft of the selected lower gear is, in a first step, raised to at least the synchronization speed by actuating synchronizer rings on the freely rotating transmission input shaft which are associated with the lowest gear on that shaft.

18. A twin-clutch transmission comprising a first transmission input shaft carrying an initially engaged gear, a second transmission input shaft carrying a selected gear to be engaged after shifting, a transmission output shaft and a synchronizer providing a torque transmitting coupling between the second transmission input shaft and the transmission output shaft for the purpose of synchronization.

19. A twin-clutch transmission according to claim 18 wherein the synchronizer comprises a friction-wheel arrangement.

20. A twin-clutch transmission according to claim 19 wherein the friction-wheel transmission arrangement comprises;

a first friction wheel on the second transmission input shaft to be synchronized;

a second friction wheel on the transmission output shaft; and a pair of friction wheels supported on a pivotable carrier and which can be pivoted into a position in which it connects the first and second friction wheels by frictional engagement.

21. A twin-clutch transmission according to claim 20 wherein the friction-wheel arrangement provides a speed ratio between the transmission output shaft and the second transmission input shaft which is lower than the speed ratio of the lowest gear on the second transmission input shaft.

22. A twin-clutch transmission according to claim 21 including first and second friction wheel arrangements each having four friction wheels, the first friction wheel arrangement being between the first transmission input shaft and the transmission output shaft and the second friction wheel arrangement being between the second transmission input shaft and the transmission output shaft.

23. A twin-clutch transmission according to claim 18 wherein the synchronizer additionally comprises a friction brake.

24. A twin-clutch transmission according to claim 19 wherein the friction-wheel arrangement comprises:

a first friction wheel on the second transmission input shaft to be synchronized;

a second friction wheel on a shaft connected to a pinion associated with a reverse gear and which reverses the direction of rotation; and a third friction wheel on a pivotable carrier which can be pivoted into a position in which the third friction wheel engages the two other friction wheel arrangements by frictional engagement.

25. A twin-clutch transmission according to claim 24, comprising:

two friction wheels or a roller-shaped friction wheel mounted on the pinion shaft and one friction wheel on each of the first and second a transmission input shafts, and a pair of friction wheels mounted coaxially with each on a pivotably supported carrier or cylindrical friction wheel engagable respectively with each of the friction wheels on the pinion shaft and on the first and second transmission input shafts.

* * * * *